United States Patent [19]

Suzuki et al.

[11] Patent Number: 4,586,099
[45] Date of Patent: Apr. 29, 1986

[54] HEAD CLEANING CASSETTE WITH AUTOMATIC STOP FEATURE

[75] Inventors: Hiroyuki Suzuki, Saitama; Shinichi Kobayashi, Chiba, both of Japan

[73] Assignee: Pioneer Electronic Corporation, Tokyo, Japan

[21] Appl. No.: 480,646

[22] Filed: Mar. 31, 1983

[30] Foreign Application Priority Data

Mar. 31, 1982 [JP] Japan .................................. 57-50945

[51] Int. Cl.[4] .......................... G11B 5/10; G11B 5/127; G11B 5/41; G11B 23/02
[52] U.S. Cl. .................................. 360/128; 360/132; 15/210 R
[58] Field of Search ....................... 360/128, 132, 137; 15/210 R

[56] References Cited

U.S. PATENT DOCUMENTS

| 4,141,053 | 2/1979 | Kara | 360/137 |
| 4,272,796 | 6/1981 | Van Kreuningen et al. | 360/128 |
| 4,442,468 | 4/1984 | d'Alayer de Costemore d'Arc | 360/128 |
| 4,454,551 | 6/1984 | Clausen et al. | 360/128 |
| 4,498,113 | 2/1985 | Clausen et al. | 360/137 |

FOREIGN PATENT DOCUMENTS

2066999 7/1981 United Kingdom ................ 360/128

Primary Examiner—John H. Wolff
Assistant Examiner—Alfonso Garcia
Attorney, Agent, or Firm—Sughrue, Mion, Zinn, Macpeak & Seas

[57] ABSTRACT

A head cleaning cassette is provided with a means by which the head is cleaned by a wiper mechanism for a predetermined time only. The cassette may be operated in either a forward or reverse mode with the same effect, rendering it easy to use without damaging the head even by an inexperienced user.

11 Claims, 10 Drawing Figures

HEAD CLEANING CASSETTE WITH AUTOMATIC STOP FEATURE

BACKGROUND OF THE INVENTION

The present invention relates to a cassette which is used for cleaning the head of a tape recorder, a cassette deck or the like.

There have conventionally been known three methods for the head cleaning of a tape cassette, a cassette deck or the like.

Figure 1:
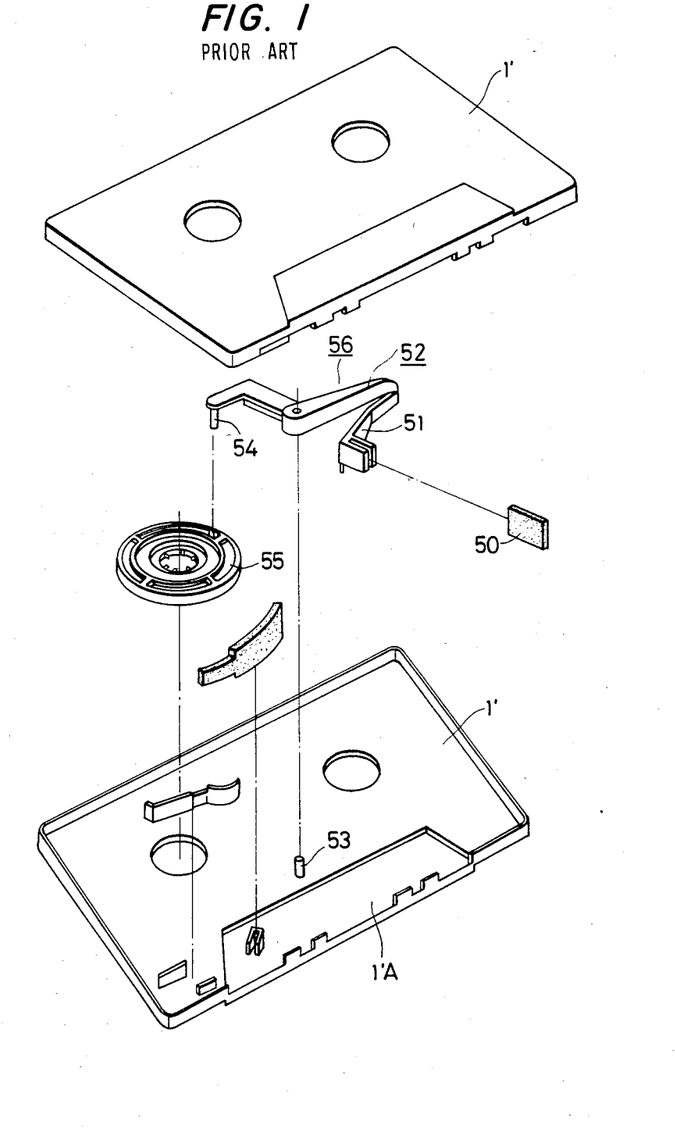
FIG. 1 is a disassembled perspective view showing one embodiment of a conventional head cleaning cassette.

In accordance with the first method, an applicator is made to absorb a solvent such as alchohol or the like, or is manually used to wipe the head. In accordance with a second method, there is employed a cleaning tape which wipes the front surface of the head thereby cleaning the same. In accordance with the third method, as shown in FIG. 1, the middle portion of a swing arm 52 which is provided with a wiper portion 50 made of felt for head contact, as well as a curved arm portion 51 which is resilient at the forward half thereof, are pivotally mounted onto a cassette proper 1' by means of a shaft 53 as shown in FIG. 1. A drive pin 54 provided at the rear end of the swing arm portion is made engage a hub 55 with a cam which is provided at the take-up side of the cassette 1'. The wipe means 56 thus constituted is stored in the cassette 1'. The cassette is mounted in the tape recorder or the like, thereby inserting the take-up side reel shaft into the hub 55 having the cam. After that, if the hub 55 is rotated, the rear end portion of the wiper means 56, where the drive pin 54 is in engagement with the hub and cam, is moved as the hub and cam rotates, so that the forward half of the swing arm 52 is swung about the shaft 53.

As a consequence, since the wiper portion 50, which is mounted to the curved arm portion 51 of the swing arm 52 fronts on a window opening 1'A, the swing arm 52 is moved so that the front surface of the head is wiped so as to be cleaned by the wiper portion 50.

Since the head is manually cleaned using the applicator or the like in accordance with the above mentioned first method, it is troublesome. In addition, since the applicator is not uniformly in contact with the head, it is impossible to ensure complete cleaning.

On the other hand, in the second method, the tape is fed while in contact with the front surface of the head, so that the front surface of the head is ground by an abrasive surface formed on the tape. Therefore, a magnetic gap portion of the head is abraded by long term use, or the magnetic gap portion gets clogged with dregs of the tape.

In accordance with the third method, the cassette 1' is mounted in the tape recorder, and the tape is turned after having inserted the reel shaft into the hub 55, so that the swing arm 52 of the wiper means 56 is provided in a way such as to wipe the front surface of the head. Therefore, as long as the reel shaft is inserted in the cassette 1' and continues to rotate, the swing arm 52 is swung without restriction, so that the head is wiped and abraded. As a result, there was little reliability in the use of this article, and thus, the third method was improper for a user having little knowledge of head cleaning.

In addition, since the hub 55 with the cam at the take-up reel side is provided in the conventional article shown in FIG. 1, rotation is freely effected at the supply reel side without being controlled by the rotation of the motor at the take-up reel side. In other words, since back tension is usually applied at the support reel side in order to prevent the tape from flexing, so that there is applied a load of light rotative power in the reverse direction, it comes to pass that the hub 55 at the take-up side rotates unnecessarily because there is no load on the supply side reel hub in the conventional head cleaner shown in FIG. 1. Furthermore, since the wiper means 56 is associated with the take-up side hub 55 in the conventional head cleaner above, there is a drawback in that the wiper means 56 is not driven in case the rewind button is operated so as to switch the driven hub, in particular, in a single motor tape recorder.

SUMMARY OF THE INVENTION

An object of the present invention, which has been achieved in view of the above, is to provide a head cleaning cassette in accordance with which a wiper means is operated for only a predetermined period of time by a simple operation in which a lock plate is moved to one side and the cassette is then inserted without regard to the rotational direction of the reel hubs at the take-up supply sides respectively, so that the head may be cleaned without overly abrading the same.

DETAILED DESCRIPTION OF THE PREFERRED EMBODIMENTS

The present invention will now be described in more detail based on embodiments thereof shown in FIGS. 2–10.

Reference numeral 1 denotes a cassette proper, reference numerals 2, 3 denotes a pair of reel hubs rotatably mounted in the cassette and reference numerals 4, 5 denotes a pair of gears which are provided at the outer peripheries of the lower surfaces of the pair of reel hubs 2, 3. There is provided an intermediate driven gear 7 between the gears 4 and 5 so as to engage the same. The gears 4, 5 are separately provided for the reel hubs 2, 3, respectively, in order to make it easy to insert the reel shafts into the reel hubs 2, 3. In particular, the reel hubs 2, 3 can slide in the radial direction as well as in the circumferential direction with respect to the gears 4, 5 when the reel shafts are inserted into the reel hubs 2, 3 at the time when the cassette 1 is mounted. In addition, the gears 4, 5 engage projections 2A, 3A on the hubs respectively, by way of projections 4A, 5A, so that the gears 4, 5 are rotated.

Reference numeral 6 denotes a drive wheel which is provided at an eccentric position on the intermediate driven gear 7. If this drive wheel is inserted in an oblong opening $8B_1$ formed at the end of a swing arm 8, which will be described later, so that it rotates as the intermediate driven gear 7 rotates, the swing arm 8 is swung by this rotation with the drive wheel in rolling contact with the inner periphery thereof.

Reference numeral 8 denotes the swing arm, which is composed of a spring-like resilient curved portion 8A bent at the forward half thereof so as to present a U-shaped configuration, and a plate-like portion 8B at the rearward half in which there is formed the oblong opening $8B_1$. Reference numeral 9 denotes a wiper portion made of felt and mounted at the end of the curved portion 8A. This wiper portion 9 fronts on a window opening 1A formed in the front surface of the cassette 1.

Reference numeral 10 denotes a second driven gear which engages the intermediate gear 7. The second driven gear 10 is coaxially provided with a small drive gear 11. The upper and lower ends of a shaft 13 of the second driven gear 10 are inserted into oblong holes 1B, 1B formed in the upper and lower surfaces of the cassette 1 so that it becomes possible for the shaft 13 to move to the right and left within the oblong holes 1B, 1B, such that the second driven gear 10 may engage either of third and fourth driven gears 15, 16 which form a group of gears for speed reduction as will be described later.

Reference numeral 17 denotes a geneva gear combined with a regular gear which is rotatably mounted to the cassette at the rear stage of the third driven gear 15. A driven pin 15A which is provided at an eccentric position on the third driven gear 15 engages grooves 17A intermittently provided by the geneva gear, so that rotative power is imparted to the geneva gear 17 by the gear 15, thereby effecting a speed reduction. At the same time, a fifth driven gear 18 which is in engagement with gear portions 17B of the combined geneva gear number is rotated at a reduced speed.

Reference numeral 19 denotes an automatic locking means for driving the tape cleaning cassette, in accordance with the present invention, for a predetermined period of time. This automatic locking means 19 is composed of a geneva stop 20 which is intermittently provided with groove portions 20A with which a pin 18A of the above mentioned fifth driven gear 18 may engage, a shoulder portion $21A_1$ with which an engaging portion 20B provided on the geneva stop 20 may engage and a lock plate 22 which is slidable forwardly and rearwardly and in which there is formed an engaging opening 21A. A sloped part $21A_2$ is provided in a way such that the lock plate 22 is moved by urging the engaging portion 20B thereagainst. The lock plate 22 is at the position indicated by the phantom line in FIG. 7 when it is not in the locking position, and the projection $22A_1$ on the upper surface of a grip portion 22A formed by extending one portion of the lock plate is moved forwardly in a slit 1C formed in the cassette. The engaging portion 20B provided on the geneva stop 20 is moved to a position at which it engages the shoulder $21A_1$ of the lock plate 22 while being guided by a guide member (not shown) to provided the locking position.

The lock plate 22 is made movable and is provided with a projection $22A_1$ on one surface of the grip portion 22A of the lock plate 22 in accordance with this embodiment. However, if there are formed slits 1C in both surfaces of the cassette 1 and there are provided projections $22A_1$, $22A_1$ on both surfaces of the grip portion 22A, it is possible that the lock plate 22 may be moved by manually moving either of the two projections $22A_1$ from outside the cassette.

Reference numeral 23 denotes a governor gear which is rotatably driven via a small drive gear 11 which engages above-mentioned fourth driven gear 16. A pair of contact elements of a governor 24 are configurated in a Y-shape, and the middle portion is pivotably mounted so as to be alternately swingable to engage the contact members with governor gear 23 to provide a load on the governor gear 23, thereby controlling the rotation of the reel hubs 2, 3. Although the governor gear 23 is provided with a load by using the governor 24 to control the rotation of reel hubs 2, 3 in accordance with this embodiment, it is also acceptable for a brake mechanism (not shown) such as a plate spring or the like to be brought into contact with the governor gear 23 so as to provide a load thereto.

The rotational axes of the third driven gear 15, the geneva gear 17, the fifth driven gear 18, the geneva stop 20, the fourth driven gear 16 and the governor gear 23 are respectively arranged on the same line. Reference numerals 25, 26 denote felt members which are brought into contact with a pinch roller or a capstan shaft through window openings 1D, 1E of the cassette by interposing plate springs 25A, 26A at the back side thereof in order to clean the pinch roller or the capstan shaft (not shown).

One embodiment in accordance with the present invention is constituted as described above. In order to clean the tape recorder head, the pair of right and left reel shafts of the tape recorder are inserted into the reel hubs 2, 3, thereby mounting the cassette in the tape recorder. Thereupon, projections provided on the inner peripheries of the reel hubs 2, 3 collide with projections provided on the outer peripheries of the pair of the reel shafts, and the reel hubs 2, 3 are moved in the circumferential direction as well as in the radial direction with respect to the gears 4, 5 to make it possible for the two reel shafts to be easily inserted into the reel hubs 2, 3. Hence, the mounting operation of the cassette is easily effected. The projection $22A_1$ is manually positioned in the slit 1C formed in the cassette 1 so that the lock plate 22 is moved to one side.

Then, the play button of the tape deck is pushed so that the take-up side reel hub 2 is rotated in the direction indicated by the arrow (a), and the several projections 2A provided on the outer periphery of the reel hub 2 engage the several projections 4A provided on the upper surface of the gear 4. The projections 3A provided on the outer periphery of the reel hub 3 engage the projections 5A provided on the upper surface of the gear 5, so that the gears 4, 5 are rotated (the gear 5 being rotated via intermediate gear 7). When the gear 4 is rotated, the intermediate driven gear 7 which engages this gear is also driven so as to rotate in the direction indicated by the arrow (b). As a result, since the drive wheel 6 provided at an eccentric position of intermediate driven gear 7 is driven while being in rolling contact with the inner periphery of the oblong opening $8B_1$ formed in the plate-like portion 8B of the swing arm 8, the swing arm 8, the central portion of which is fixed such that the swing arm 8 is pivotable, is swung about its support point. As a result, the head is wiped and cleaned by the wiper portion 9 at the end of the spring-like curved portion 8A formed at the forward half of the swing arm 8. At the same time, the pinch roller and the capstan shaft (not shown) are rotated, so that the felt members 25, 26 come in contact therewith, thereby cleaning the pinch roller and the capstan shaft.

The gear 5, which is in engagement with the intermediate driven gear 7, is also driven as noted, so that the reel hub 3 at the support side, into which is inserted a reel shaft, is also driven so as to rotate.

In addition, since the second driven gear 10, which is in engagement with the intermediate driven gear 7, is driven so as to rotate, the small drive gear 11 provided coaxially with the second driven gear 10 is also rotated. At this time, the shaft 13 of the second driven gear 10, which is inserted into oblong upper and lower holes 1B, 1B formed in the cassette, is moved toward the side of the driving shaft of the tape recorder by a rotational moment. That is, the small drive gear 11 is moved to engage the fourth driven gear 16, and the rotation of the intermediate driven gear 7 is transmitted to the fourth driven gear 16 via the second driven gear 10, so that the third driven gear 15, which is in engagement with the fourth driven gear 16, rotates. Hence, the combined geneva gear 17, into which is fitted the driven pin 15A of the third driven gear 15 is rotated at a reduced speed, and drives the fifth driven gear 18 which is in engagement with the gear portion 17B thereof. On the other hand, the governor gear 23 engages the fourth driven gear 16. The pair of contact elements 24A, 24A of the governor member 24 are alternately brought into contact with the governor gear 23 upon swinging the same, so that a load is imparted to the reel hubs 2, 3.

Figure 8:
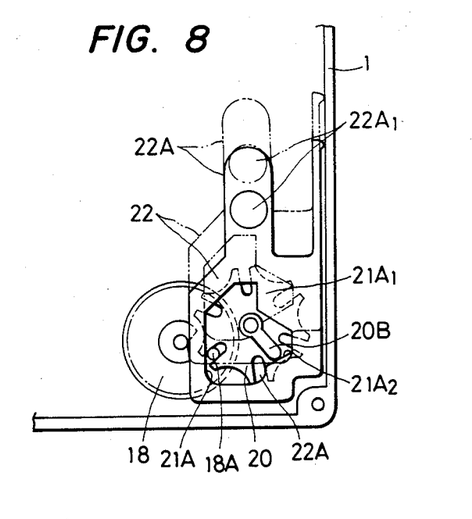
FIG. 8 is likewise a partially cut away plan view which shows a state in which the lock plate is advanced.

The drive pin 18A of the fifth driven gear 18 is fitted into the groove portion 20A so as to intermittently rotate the geneva stop 20. In addition, the sloped portion 21A$_2$ formed on the inner periphery of the engaging opening 21A of the lock plate 22, which is moved to the position shown in FIG. 7 in phantom and set, is pushed by the engaging portion 20B as the geneva stop 20 rotates as shown in FIG. 8, so that the lock plate 22 is successively moved to the position shown in FIG. 2. If the engaging portion 20B of the geneva stop 20 then engages the shoulder portion 21A$_1$ of the lock plate 22, which is moved to the advanced position, the rotation of the geneva stop 20 is brought to a halt. Therefore, since a load is applied to the motor rotating the reel shaft which is inserted into the reel hub 2, the rotation of the motor is automatically brought to a halt in the same manner as in the conventional detection of the tape end. The operation button such as the play button or the like is thus automatically restored. Thus, the operation of cleaning the head is ended.

In addition, if the rewind button is pushed or the take-up side and the supply side are reversed in a cassette tape recorder of the automatic reverse type or the like, the reel hub 3 becomes the take-up side. In this case, rotation is effected in the direction indicated by the arrow (a') in FIG. 2 by so driving the reel hub 3. The swing arm 8 is pivoted by the rotation of the intermediate driven gear 7 so that the head is cleaned in this case as well. At the same time, the reel hub 2, which is in engagement with the intermediate driven gear 7, is also rotated. However, since the reel hub 2 and the gear 5 are reversely rotated in the direction indicated by the arrow (a') opposite to that in the above described operation, the rotation direction of the intermediate driven gear 7 is also reversed. The shaft 13 of the second driven gear 10 thus moves in the oblong holes 1B, 1B so that the second driven gear 10 is detached from the fourth driven gear 16, and at the same time, the small driven gear 11 engages the third driven gear 15, so that torque is transmitted thereto. In this case, although the small drive gear 11 was in engagement with the fourth driven gear 16 in the above-described operation, and the rotational direction of the gear 11 is opposite that before, the rotational direction of the third driven gear 15 at this time is the same as in the above described operation because the small drive gear 11 is now detached from the fourth driven gear 16. As a result, the rotational direction of the geneva stop 20 at the rear stage is constant. In other words, the geneva stop 20 always rotates clockwise without regard to whether the take-up side is the reel hub 2 or 3.

Figure 2:
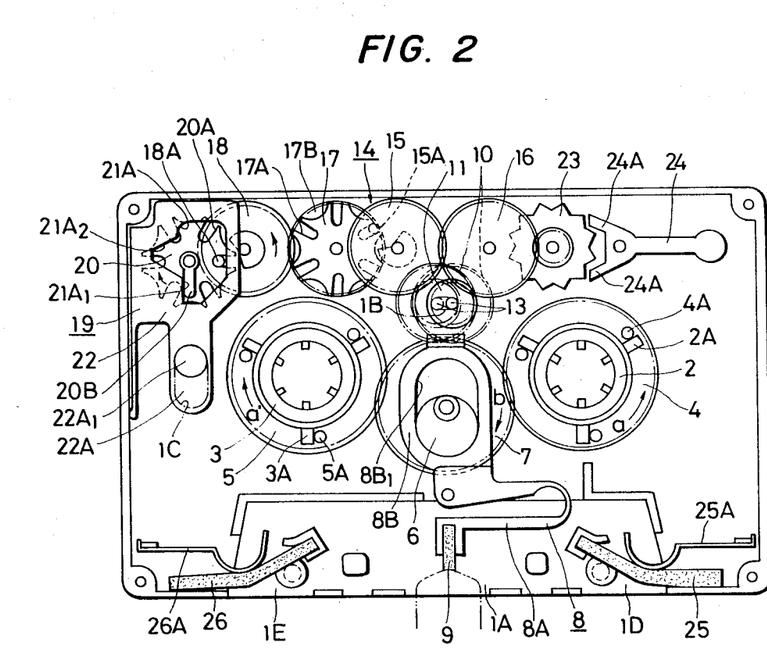
FIG. 2 is a plan view showing one embodiment of the present invention, in a state in which the cover of the cassette is removed.
Figure 3:
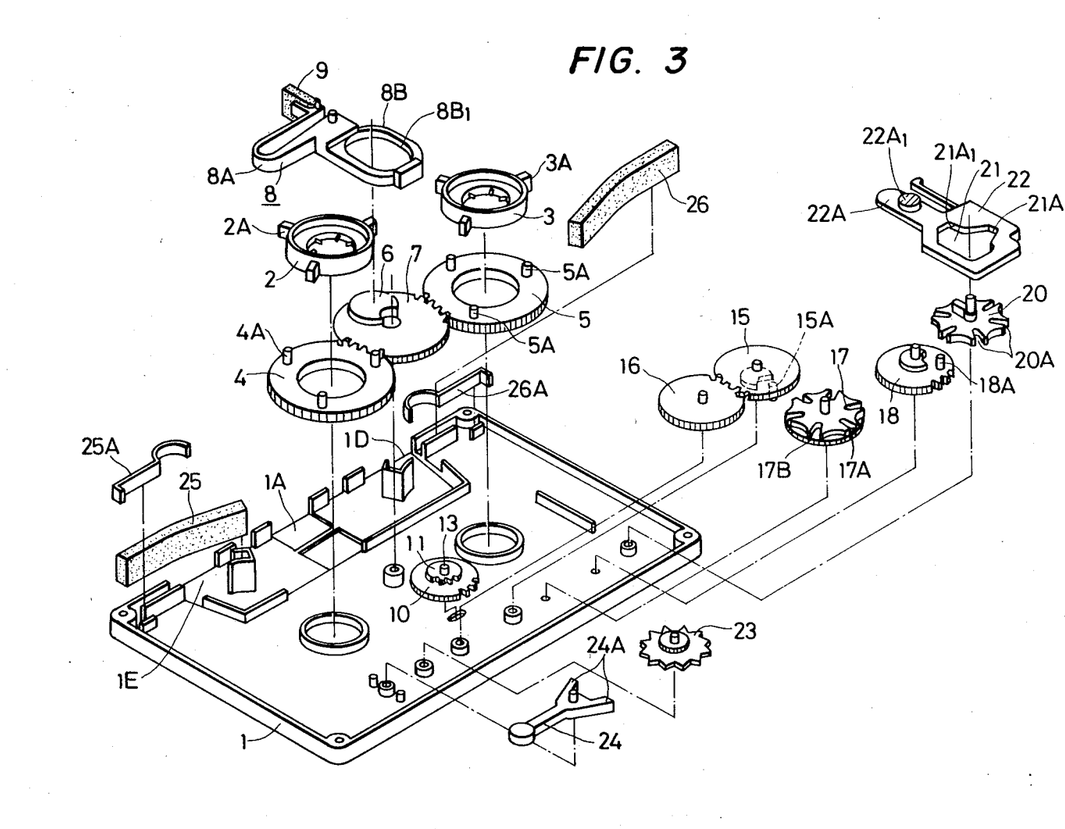
FIG. 3 is a disassembled perspective view of the embodiment shown in FIG. 2.
Figure 4:
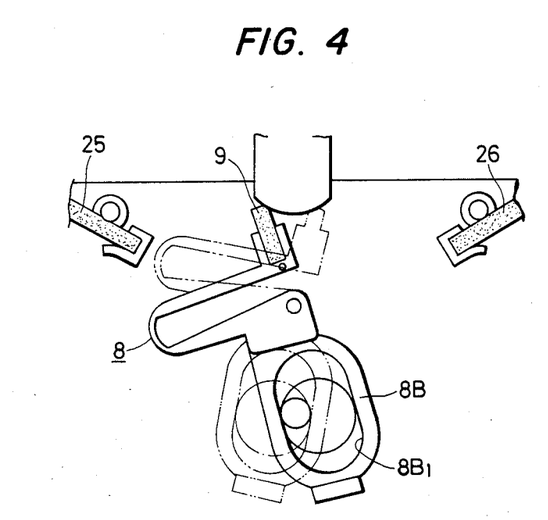
FIG. 4 is a plan view showing the actuation of the wiper means of the embodiment.
Figures 5, 6:
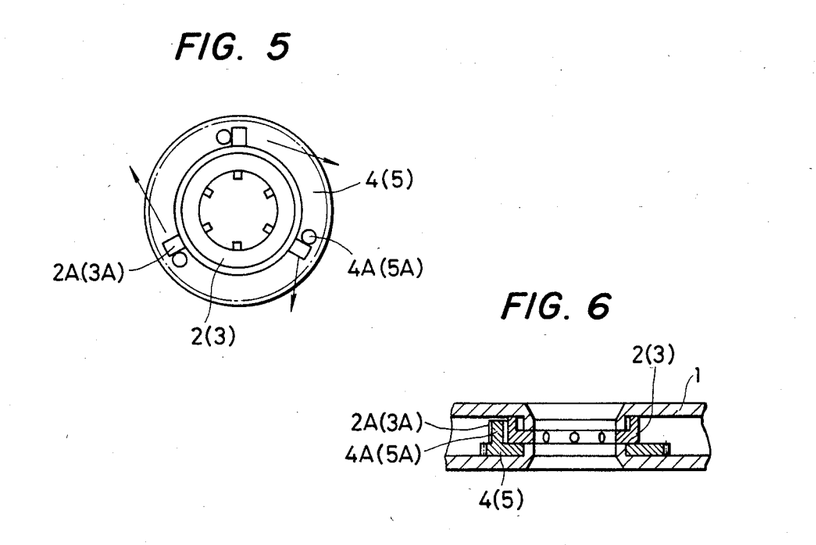
FIG. 5 is a plan view showing the reel hub and a gear of the embodiment.
FIG. 6 is a cross sectional view of FIG. 5.
Figure 7:
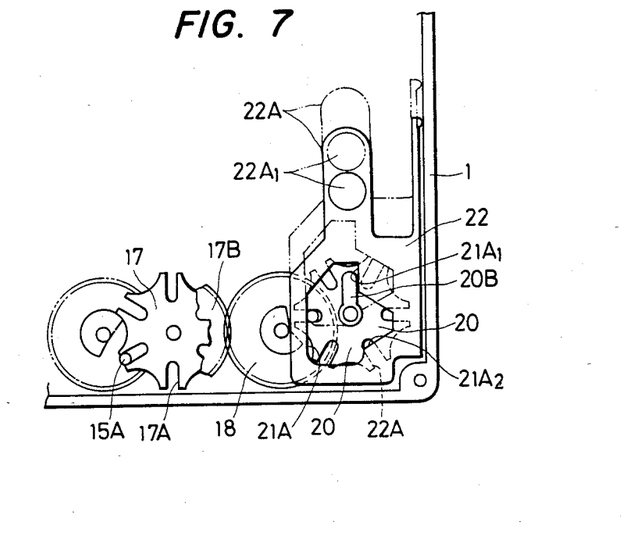
FIG. 7 is a partially cut away plan view of essential parts, in which the solid line indicates the stop position and the phantom line indicates the set position of the automatic locking means.

In addition, as long as the cassette 1 is mounted after manually disengaging the engaging portion 20B of the geneva stop 20 from the shoulder 21A$_1$ of the lock plate 22 by moving the lock plate 22 forwardly in FIG. 2, the head may be cleaned without regard to whether the upper surface or the lower surface (the A side or the B side) of the cassette is upwardly oriented when the cassette is inserted.

Figure 9:
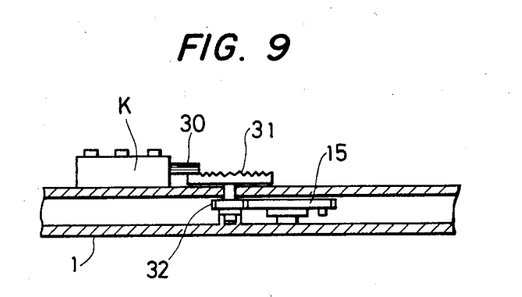
FIG. 9 is a cross sectional view showing a state in which a counter of a mechanical type and a third driven gear are coupled to one another.
Figure 10:
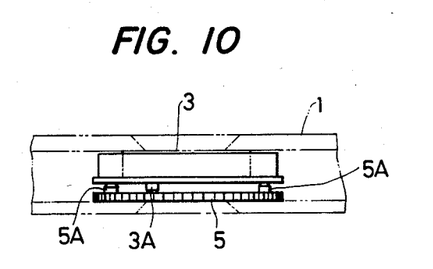
FIG. 10 is a cross sectional view showing another modified example in which the reel hub and the gear provided on the outer periphery thereof are split in two for employment of a cleaning tape.

In addition, if an indicator is placed on one of the gears of the group 14 of speed reducing gears, for example, on the third driven gear 15, and the cassette is formed of a transparent synthetic resin or a window opening is formed therein in the case of a non-transparent synthetic resin, it is possible to carry out the head cleaning operation for a desired period of time by pushing the stop button even while the geneva stop 20 is making a turn. Likewise, it is possible to count the period of time required for the operation of cleaning the head, where one gear among the group 14, for example, the third driven gear 15, is coupled to a worm 30 for driving the wheel of a conventional counter K of a mechanical type mounted to the cassette via a crown gear 31 and a small gear 32, as shown in FIG. 9. It is also possible to effect cleaning for a desired period of time with respect to the configuration of the reel hub, as shown in FIG. 10, in accordance with which there is used a cleaning tape by providing a table in such a way that the cleaning tape is laid on the pin 3A.

In accordance with the present invention as described above, it is possible to provide rotation in the same direction as that of the reel hub at the take-up side to a rear stage via a second driven gear which selectively engages either a fourth driven gear or a third driven gear. Therefore, since it is possible for the geneva stop of the automatic locking means to always rotate in the same direction without regard to the rotational direction of the pair of reel hubs at the take-up and supply sides, it is possible for the automatic locking means to be properly actuated so as to swing the wiper means for a predetermined period of time, thereby cleaning the head. As a result, there are not caused any operational problems, for example, in that the head is excessively abraded by cleaning.

Since it is acceptable merely if the lock plate of the automatic locking means is moved to one side and the cassette mounted, it is possible even for a user who has little knowledge of cleaning operations to simply and reliably effect cleaning of the head.

What is claimed is:

1. A head cleaning cassette, comprising:

head cleaning means including a wiper portion for cleaning said head;

gear means including drive means for reciprocatingly moving said head cleaning means;

means for transferring torque from reel hubs of said cassette to said gear means; and means for halting the cleaning operation of said head cleaning means after a predetermined time, said means for halting including reduction gearing means receiving a rotative power input from said gear means and gearing switch means, said gearing switch means being movable to engage one of two input gears of said reduction gearing means in dependence upon the direction of rotation of said reel hubs, said reduction gearing means including geneva gear means, one geneva gear of said geneva gear means including stop means, said reduction gearing means and said switch means being arranged such that the direction of rotation of said geneva gear means is constant regardless of the rotation direction of said reel hubs.

2. A device as claimed in claim 1, wherein said gear means comprises an intermediate gear, said drive means including eccentric means for engaging said head cleaning means.

3. A device as claimed in claim 2, said head cleaning means including means for converting a rotational movement of said eccentric means into a pivotal swinging of said wiper portion.

4. A device as claimed in claim 3, said converting means including an oblong opening at one end of said head cleaning means for receiving said eccentric means.

5. A device as claimed in claim 1, said torque transfer means including hub gears associated with each of said reel hubs, said reel hubs and said hub gears being slightly relatively radially and circumferentially movable, said hub gears each engaging said gear means.

6. A device as claimed in claim 1, wherein said halting means further comprises:

(a) governor means for impressing a load upon said reduction gearing means and said gear means; and (b) locking means for engaging said reduction gearing means for halting the operation thereof.

7. A device as claimed in claim 6, said locking means including a lock plate slidable within said cassette and movable to a set position from the exterior of said cassette.

8. A device as claimed in claim 7, said stop means being provided integrally with said one geneva gear, said lock plate including at least a cam portion engageable with said stop means to shift said lock plate from said set position to a lock position, and an abuttment portion subsequently engageable with said stop means for halting the rotation of said one geneva gear and said gearing means.

9. A device as claimed in claim 6, said governor means including a governor gear receiving a rotative input from said reduction gearing means, and a swingable governor member alternatingly engaging said governor gear so as to apply a load thereto.

10. A device as claimed in claim 6, said reduction gearing means including a mechanical counter mechanism.

11. A head cleaning cassette, comprising: reel hubs for receiving reel shafts of a tape recorder, means stored in said cassette for cleaning said head, means for detecting that the head has been cleaned for a predetermined period of time, means for transmitting the rotation of one of said reel hubs to said detecting means so that the magnetic head may be cleaned for said predetermined time period, and means responsive to said detecting means for halting rotation of said reel hubs and stopping the cleaning of said head after said predetermined time period, said means for transmitting including reduction gearing means and gearing switch means, said gearing switch means being movable to engage one of two input gears of said reduction gearing means in dependence upon the direction of rotation of said reel hubs, said reduction gearing means including geneva gear means, one geneva gear of said geneva gear means including stop means, said detecting means being responsive to said stop means to indicate when said head has been cleaned for said predetermined time period, said reduction gearing means and said switch means being arranged such that the direction of rotation of said geneva gear means is constant regardless of the rotation direction of said reel hubs.

* * * * *